United States Patent
Liu et al.

(10) Patent No.: US 10,478,967 B2
(45) Date of Patent: Nov. 19, 2019

(54) SERVO CONTROL SYSTEM AND ROBOT

(71) Applicant: UBTECH Robotics Corp., Shenzhen (CN)

(72) Inventors: Dong Liu, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 382 days.

(21) Appl. No.: 15/321,728

(22) PCT Filed: Oct. 28, 2016

(86) PCT No.: PCT/CN2016/103825
§ 371 (c)(1),
(2) Date: Dec. 22, 2016

(87) PCT Pub. No.: WO2018/076292
PCT Pub. Date: May 3, 2018

(65) Prior Publication Data
US 2018/0257223 A1    Sep. 13, 2018

(51) Int. Cl.
*H02P 6/20*    (2016.01)
*B25J 9/12*    (2006.01)
*B25J 9/00*    (2006.01)
*B25J 13/00*    (2006.01)
*G05B 15/02*    (2006.01)

(52) U.S. Cl.
CPC ............ *B25J 9/126* (2013.01); *B25J 9/0009* (2013.01); *B25J 13/006* (2013.01); *G05B 15/02* (2013.01); *Y10S 901/06* (2013.01); *Y10S 901/09* (2013.01); *Y10S 901/23* (2013.01)

(58) Field of Classification Search
CPC .......... B25J 9/126; G05B 15/02; G05B 19/02; H02P 27/08; Y10S 901/09; Y10S 901/23
See application file for complete search history.

(56) References Cited

U.S. PATENT DOCUMENTS

2006/0071622 A1*   4/2006   Townsend .............. B25J 9/1612
  318/400.31

FOREIGN PATENT DOCUMENTS

CN    202754140 U    2/2013
CN    103753535 A    4/2014

OTHER PUBLICATIONS

Motorola Embedded Motion Control (Year: 2000).*
MAX626/7/8-TSC426/7/8 (Year: 1996).*
ISR for PCT/CN2016/103825.
Written opinions of ISA for PCT/CN2016/103825.

* cited by examiner

*Primary Examiner* — Muhammad S Islam

(57) ABSTRACT

The present invention discloses a servo control system and a robot. The servo control system is applied to a servo and includes a main control module and a driving module including a driving circuit and an electronic switch circuit. The driving circuit is coupled to the main control module. The electronic switch circuit is coupled between the driving circuit and a driving motor of the servo. Wherein, the driving circuit receives a control signal outputted by the main control module and outputs a driving signal according to the control signal. The electronic switch circuit outputs a driving pulse to the driving motor according to the driving signal, to control the rotation of the driving motor. In the above manner, it can be convenient for heat dissipation and strengthens the driving capability.

20 Claims, 8 Drawing Sheets

SERVO CONTROL SYSTEM AND ROBOT

BACKGROUND

1. Technical Field

The present disclosure relates to automation control technology, and particularly to a serve control system and a robot.

2. Description of Related Art

With the advancement of technology, robotic technology has been greatly developed and been gradually into people's daily lives. In robotic technology, servos are important assemblies of a robot. A servo control system is an important component of a servo and controls each servo of a robot to perform various operations.

Servo control systems mostly use three-phase brushless driving motors to drive the movable components of robots so as to drive robots to perform various operations. However, there would usually exist the problem of poor heat dissipation when the driving circuit of a conventional servo control system drives high power driving motors, and the driving capability is limited.

SUMMARY

In view of this, the present invention provides a servo control system and a robot that are convenient for heat dissipation and strengthen the driving capability.

In order to resolve the aforementioned problems, a servo control system provided by the present invention is applied to a servo. The servo control system includes a main control module; and a driving module including a driving circuit and an electronic switch circuit. The driving circuit is coupled to the main control module, and the electronic switch circuit is coupled between the driving circuit and a driving motor of the servo. The driving circuit receives a control signal outputted by the main control module and outputs a driving signal according to the control signal, and the electronic switch circuit outputs a driving pulse to the driving motor according to the driving signal, to control the driving motor to rotate.

Wherein, the driving motor includes a first terminal, a second terminal and a third terminal. The driving circuit includes three driving units for powering up any two of the first terminal, the second terminal and the third terminal of the driving motor so as to control the driving motor to rotate in a forward direction or a reverse direction.

Wherein, the electronic switch circuit includes a first MOS transistor, a second MOS transistor, a third MOS transistor, a fourth MOS transistor, a fifth MOS transistor and a sixth MOS transistor. Control terminals of the first MOS transistor, the second MOS transistor, the third MOS transistor, the fourth MOS transistor, the fifth MOS transistor and the sixth MOS transistor are coupled to the driving circuit. First path terminals of the first MOS transistor, the third MOS transistor and the fifth MOS transistor are connected to a first reference voltage. A second path terminal of the first MOS transistor is coupled to the first path terminal of the second MOS transistor and the first terminal of the driving motor. A second path terminal of the third MOS transistor is coupled to the first path terminal of the fourth MOS transistor and the second terminal of the driving motor. A second path terminal of the fifth MOS transistor is coupled to the first path terminal of the sixth MOS transistor and the third terminal of the driving motor. Second path terminals of the second MOS transistor, the fourth MOS transistor and the sixth MOS transistor are connected to a second reference voltage.

Wherein, the driving unit of the driving circuit includes a driving chip, a first capacitor, a fourth resistor, a fifth resistor, a sixth resistor, a first diode, a seventh resistor, an eighth resistor, a second diode, a third diode, and a second capacitor. The driving chip includes a first through eighth terminals.

The first terminal of the driving chip is coupled to a first voltage terminal, and the first terminal is further rounded via the first capacitor. The second terminal and the third terminal of the driving chip are coupled to the main control chip, and the second terminal is further coupled to a second voltage terminal via the fourth resistor. The third terminal is grounded via the fifth resistor. The fourth terminal of the driving chip is coupled to the second path terminal of the second MOS transistor. The fifth terminal of the driving chip is coupled to the control terminal of the second MOS transistor. Two ends of the sixth resistor are coupled to the first diode in parallel. A cathode of the first diode is coupled to the fifth terminal of the driving chip, and an anode of the first diode is coupled to the control terminal of the second MOS transistor. The sixth terminal of the driving chip is coupled to the second path terminal of the second MOS transistor. The seventh terminal of the driving chip is coupled to the control terminal of the first MOS transistor via the seventh resistor. Two ends of the seventh resistor are coupled to the second diode in parallel and a cathode of the second diode is coupled to the seventh terminal of the driving chip. An anode of the second diode is coupled to the control terminal of the first MOS transistor. The eighth terminal of the driving chip is coupled to the first voltage terminal via the eighth resistor and the third diode and a cathode of the third diode is coupled to the eighth resistor. An anode of the third diode is coupled to the first terminal of the driving chip, and the eighth terminal and the sixth terminal of the driving chip are coupled to each other via the second capacitor.

Wherein, the driving chip outputs control singles respectively to the control terminal of the first MOS transistor and the control terminal of the second MOS transistor via the seventh terminal and the fifth terminal, which controls the first MOS transistor and the second MOS transistor to conduct, thereby powering up the first terminal of the driving motor.

Wherein, the servo control system further includes a current sampling module. An input terminal of the current sampling module is coupled to the electronic switch circuit, and an output is coupled to the main control module. The current sampling module is configured to collect current operation current of the driving motor and transmit the current operation current of the driving motor to the main control module.

Wherein, the servo control system further includes a communication module coupled to the main control module and a host computer and configured to maintain a communication between the main control module and the host computer.

Wherein, the servo control system further includes a power supply module and a charge detection module coupled to me main control module. The power supply module is configured to provide a power supply, and the charge detection module is configured to collect a charge of a battery inside the servo.

Wherein, the servo control system further includes an angle collection module coupled to the main control module.

The angle collection module is configured to acquire information of rotation angle of the servo, and the main control module is further configured to control motion of the servo according to the information of angle.

Wherein, the angle collection module is a magnetic encoder, and is configured to acquire information of angle of the servo according to change of magnetic field when the driving motor rotates.

Wherein, the servo control system further includes a temperature collection module coupled to the main control module. The temperature collection module is configured to collect a temperature of the driving motor. If the collected temperature of the driving motor is greater than a preset threshold value, the main control module controls the driving motor to stop rotating, or reduces a rotation speed of the driving motor.

The present invention further provides a robot including a central processor, a CAN bus and a plurality of servos. Each servo includes a servo control system, and each servo control system communicates with the central processor via the CAN bus. The servo control system includes a main control module; and a driving module including a driving circuit and an electronic switch circuit. The driving circuit is coupled to the main control module, and the electronic switch circuit is coupled between the driving circuit and a driving motor of the servo. The driving circuit receives a control signal outputted by the main control module and outputs a driving signal according to the control signal, and the electronic switch circuit outputs a driving pulse to the driving motor according to the driving signal, to control the driving motor to rotate.

Wherein, the driving motor includes a first terminal, a second terminal and a third terminal. The driving circuit includes three driving units for powering up any two of the first terminal, the second terminal and the third terminal of the driving motor so as to control the driving motor to rotate in a forward direction or a reverse direction.

Wherein, the electronic switch circuit includes a first MOS transistor, a second MOS transistor, a third MOS transistor, a fourth MOS transistor, a fifth MOS transistor and a sixth MOS transistor. Control terminals of the first MOS transistor, the second MOS transistor, the third MOS transistor, the fourth MOS transistor, the fifth MOS transistor and the sixth MOS transistor are coupled to the driving circuit. First path terminals of the first MOS transistor, the third MOS transistor and the fifth MOS transistor are connected to a first reference voltage. A second path terminal of the first MOS transistor is coupled to the first path terminal of the second MOS transistor and the first terminal of the driving motor. A second path terminal of the third MOS transistor is coupled to the first path terminal of the fourth MOS transistor and the second terminal of the driving motor. A second path terminal of the fifth MOS transistor is coupled to the first path terminal of the sixth MOS transistor and the third terminal of the driving motor. Second path terminals of the second MOS transistor, the fourth MOS transistor and the sixth MOS transistor are connected to a second reference voltage.

Wherein, the servo control system further includes a current sampling module. An input terminal of the current sampling module is coupled to the electronic switch circuit, and an output is coupled to the main control module. The current sampling module is configured to collect current operation current of the driving motor and transmit the current operation current of the driving motor to the main control module.

Wherein, the servo control system further includes a communication module coupled to the main control module and a host computer and configured to maintain a communication between the main control module and the host computer.

Wherein, the servo control system further includes a power supply module and a charge detection module coupled to the main control module. The power supply module is configured to provide a power supply, and the charge detection module is configured to collect a charge of a battery inside the servo.

Wherein, the servo control system further includes an angle collection module coupled to the main control module. The angle collection module is configured to acquire information of rotation angle of the servo, and the main control module is further configured to control motion of the servo according to the information of angle.

Wherein, the angle collection module is a magnetic encoder, and is configured to acquire information of angle of the servo according to change of magnetic field when the driving motor rotates.

Wherein, the servo control system further includes a temperature collection module coupled to the main control module. The temperature collection module is configured to collect a temperature of the driving motor. If the collected temperature of the driving motor is greater than a preset threshold value, the main control module controls the driving motor to stop rotating, or reduces a rotation speed of the driving motor.

With the aforementioned technical solutions, the beneficial effects of the present invention are: Being different from the existing technology, the servo control system of the present invention includes a main control module and a driving module including a driving circuit and an electronic switch circuit. The driving circuit is coupled to the main control module. The electronic switch circuit is coupled between the driving circuit and a driving motor of the servo. The driving circuit receives a control signal outputted by the main control module and outputs a driving signal according to the control signal. The electronic switch circuit outputs a driving pulse to the driving motor according to the driving signal, to control the driving motor to rotate. By arranging the driving circuit and the electronic switch circuit to be separated from each other, it can be convenient for heat dissipation and strengthens the driving capability.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained based on these drawings without creative work.

DETAILED DESCRIPTION

The technical solutions of the embodiment(s) of the present invention will be clearly and completely described in conjunction with the drawings of the embodiment(s) of the present invention. Obviously, the described embodiment(s) is only a part of embodiments of the present invention, but not all the embodiments. Based on the embodiment(s) of the present invention, all other embodiments obtained by those skilled in the art without creative work are all within the protection scope of the present invention.

Figure 1:
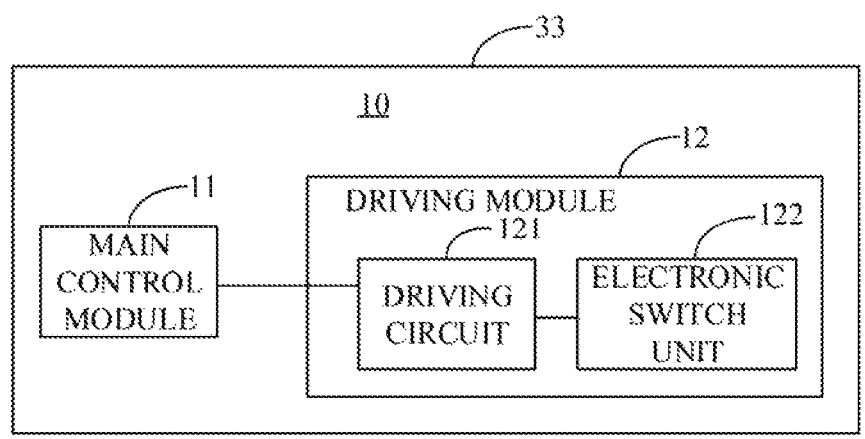
FIG. 1 is a schematic block diagram of a servo of a preferred embodiment of the present invention.
Figure 2:
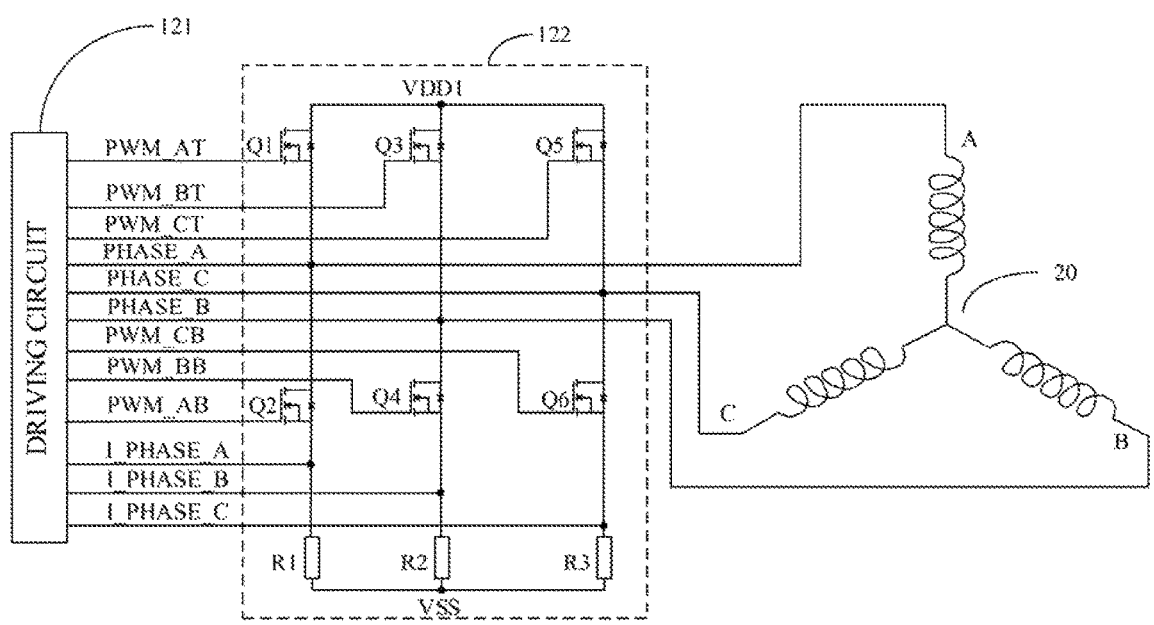
FIG. 2 is a schematic circuit diagram of a driving module of FIG. 1.

FIG. 1 is a schematic block diagram of a servo of a preferred embodiment of the present invention. Referring to FIG. 1, a servo control system 10 is applied to a servo and it includes a main control module 11 and a driving module 12. The driving module 12 includes a driving circuit 121 and an electronic switch circuit 122. Referring also to FIG. 2, the servo 3 includes a driving motor 20. The driving circuit 121 coupled to the main control module 11. The electronic switch circuit 122 is coupled between the driving circuit 121 and the driving motor 20 of the servo 33. Wherein, the driving circuit 121 receives a control signal outputted by the main control module 11 and outputs a driving signal according to the control signal. The electronic switch circuit 122 outputs a driving pulse to the driving motor 20 according to the driving signal, to control the driving motor 20 to rotate. In an embodiment of the present invention, by arranging the driving circuit and the electronic switch circuit to be separated from each other, it can be convenient for heat dissipation and strengthens the driving capability.

In an embodiment of the present invention, the driving motor 20 is to three-phase driving motor. The neutral points of three-phase windings are coupled together. There are always two phase windings that are energized to control the driving motor 20 to rotate in a forward direction or in a reverse direction at any moment. The driving motor includes a first terminal A, a second terminal B and a third terminal C. The electronic switch circuit 122 includes a first MOS transistor Q1, a second MOS transistor Q2, a third MOS transistor Q3, a fourth MOS transistor Q4, a fifth MOS transistor QS and a sixth MOS transistor Q6. Control terminals of the first MOS transistor Q1, the second MOS transistor Q2, the third MOS transistor Q3, the fourth MOS transistor Q4, the fifth MOS transistor Q5 and the sixth MOS transistor Q6 are coupled to the driving circuit 121. First path terminals of the first MOS transistor Q1 the third MOS transistor Q3 and the fifth MOS transistor Q5 are connected to a first reference voltage VDD1. A second path terminal of the first MOS transistor Q1 is coupled to the first path terminal of the second MOS transistor Q2 and the first terminal A (i.e. phase A) of the driving motor 20. A second path terminal of the third MOS transistor Q3 is coupled to the first path terminal of the fourth MOS transistor Q4 and the second terminal B (i.e. phase B) of the driving motor 20. A second path terminal of the fifth MOS transistor Q5 is coupled to the first path terminal of the sixth MOS transistor Q6 and the third terminal C (i.e. phase C) of the driving motor 20. Second path terminals of the second MOS transistor Q2, the fourth MOS transistor Q4 and the sixth MOS transistor Q6 are connected to a second reference voltage VSS. Wherein, the first reference voltage VDD1 is preferable 24V, and the second reference voltage VSS is preferable ground.

More specifically, the control terminal of the first MOS transistor Q1 is coupled to the first terminal PWM_AT of the driving circuit 121. The second path terminal of the first MOS transistor 1 is coupled to the second terminal PHASE_A of the driving circuit 121. The control terminal of the second MOS transistor Q2 is coupled to the third terminal PWM_AB of the driving circuit 121. The second path terminal of the second MOS transistor Q2 is coupled to the fourth terminal I_PHASE_A of the driving circuit 121. The control terminal of the third MOS transistor Q3 is coupled to the fifth terminal PWM_BB of the driving circuit 121. The second path terminal of the third MOS transistor Q3 is coupled to the sixth terminal PHASE_B of the driving circuit 121. The control terminal of the fourth MOS transistor Q4 is coupled to the seventh terminal PWM_BB of the driving circuit 121. The second path terminal of the fourth MOS transistor Q4 is coupled to the eighth terminal I_PHASE_B of the driving circuit 121. The control terminal of the fifth MOS transistor Q5 is coupled to the ninth terminal PWM_CT of the driving circuit 121. The second path terminal of the fifth MOS transistor Q5 is coupled to the tenth terminal PHASE_C of the driving circuit 121. The control terminal of the sixth MOS transistor Q6 is coupled to the eleventh terminal PWM_CB of the driving circuit 121. The second path terminal of the sixth MOS transistor Q6 is coupled to the twelfth terminal I_PHASE_C of the driving circuit 121. First path terminals of the second MOS transistor Q2, the fourth MOS transistor Q4 and the sixth MOS transistor Q6 are connected to the second path terminals of the first MOS transistor Q1, the third MOS transistor Q3 and the fifth MOS transistor Q5. Second path terminals of the second MOS transistor Q2, the fourth MOS transistor Q4 and the sixth MOS transistor Q6 are grounded, respectively, via a first resistor R1, a second resistor R2 and a third resistor R3. The first path terminal and the second path terminal of each MOS transistor correspond respectively to the source and the drain of the MOS transistor.

The working principle of the electronic switch unit 122 is as follows.

The first terminal PWM_AT of the driving circuit 121 outputs a control signal to the control terminal of the first MOS transistor Q1, and the third terminal PWM_AB outputs at control signal to the control terminal of the second MOS transistor Q2, which respectively controls the first MOS transistor Q1 and the second MOS transistor Q2 to conduct, thereby powering up the first terminal A of the driving motor 20.

Similarly, the driving circuit 121 controls the third MOS transistor 3 and the fourth MOS transistor Q4 to conduct, respectively, via the fifth terminal PWM_BT and the seventh terminal PWM_BB, to power up the second terminal B of the driving motor 20. The driving circuit 121 controls the fifth MOS transistor Q5 and the sixth MOS transistor Q6 to conduct, respectively, via the ninth terminal PWM_CT and the eleventh terminal PWM_CB, to power up the third terminal C of the driving motor 20. In an embodiment of the present invention, the driving circuit 121 simultaneously powers up, via the electronic switch unit 122, any two terminals of the first terminal A, the second terminal B and the third terminal C of the driving motor 20 so as to control the driving motor 20 to rotate in a forward direction or a reverse direction.

Figure 3:
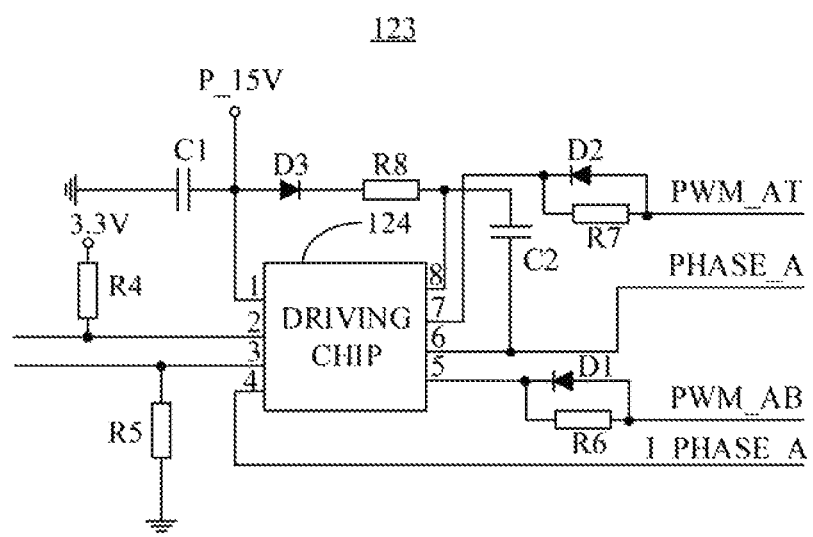
FIG. 3 is a circuit diagram of a driving circuit of FIG. 1.

The driving circuit 121 includes three driving units for respectively driving the first terminal A, the second terminal B and the third terminal C of the driving motor 20. Referring to FIG. 3, taking a driving unit 123 for driving the first terminal A of the driving motor 20 as an example. The driving unit o123 includes a driving chip 124. The driving chip 124 includes a first through eighth terminals 1-8 first terminal 1 of the driving chip 124 is coupled to a first voltage terminal P_15V. The first, terminal 1 is further grounded via a first capacitor C1. The second terminal 2 and the third terminal 3 of the driving chip 124 are coupled to a main control chip 11. The second terminal 2 is further coupled to a second voltage terminal P_3.3V via a fourth resistor R4. The third terminal 3 is further grounded via a fifth resistor R5. The fourth terminal 4 of the driving chip 124 is coupled to the second path terminal I_PHASE_A (as shown in FIG. 2) of the second MOS transistor Q2. The fifth terminal 5 of the driving chip 124 is coupled to the control terminal PWM_AB (as shown in FIG. 2) of the second MOS transistor Q2 via a sixth resistor R6. Two ends of the sixth resistor R6 are coupled to the first diode D1 in parallel. A cathode of the first diode D1 is coupled to the fifth terminal 5 of the driving chip 124. An anode of the first diode D1 is coupled to the control terminal PWM_AB (as shown in FIG. 2) of the second MOS transistor Q2. The sixth terminal 6 of the driving chip 124 is further coupled to the second path terminal PHASE_A (as shown in FIG. 2) of the first MOS transistor Q1. The seventh terminal 7 of the driving chip 124 is coupled to the control terminal PWM_AT as shown in FIG. 2) of the first MOS transistor Q1 via a seventh resistor R7. Two ends of the seventh resistor R7 are coupled to a second diode D2 in parallel. A cathode of the second diode D2 is coupled to the seventh terminal 7 of the driving chip 124. An anode of the second diode D2 is coupled to the control terminal PWM_AT of the first MOS transistor Q1. The eighth terminal 8 of the driving chip 124 is coupled to, via an eighth resistor R8 and a third diode D3, a node between the first voltage terminal P_15V, the first terminal 1 of the driving chip 124 and the first capacitor C1. An anode of the third diode D3 is coupled to the first terminal of the driving chip 124. A cathode of the third diode D3 is coupled to the eighth resistor R8. The eighth terminal 8 and the sixth terminal 6 of the driving chip 124 are coupled to each other via a second capacitor C2.

The driving chip 124 outputs, via the seventh terminal 7 and the fifth terminal 5, control signals to the control terminal PWM_AT of the first MOS transistor Q1 and the control terminal PWM_AB of the second MOS transistor Q2, which controls the first MOS transistor Q1 and the second MOS transistor Q2 to conduct, thereby powering up the first terminal A of the driving motor 20.

The second terminal PHASE_A of the driving circuit 121 is a self-lift terminal. During operation, the first voltage terminal P_15V of the driving circuit 121 is coupled to the first terminal PWM_AT of the driving circuit 121, to provide a voltage of 15V to the control terminal of the first MOS transistor Q1, thereby controlling the voltage of the control terminal of the first MOS transistor Q1 to be greater than the voltage of the second path terminal, to cause the first MOS transistor Q1 to conduct again.

The driving units of the driving circuit 121 for driving the second terminal B (phase B) and the third terminal C (phase C) of the driving motor 20 and the driving unit 123 of the first terminal A are the same in structural composition, element connections and working principle, and are not repeated herein. In an embodiment of the present invention, the driving circuit 121 powers up two terminals of the first terminal A, the second terminal B and the third terminal C of the driving motor 20 at the same time, thereby controlling the driving motor 20 to rotate in a forward direction or in a reverse direction. In an embodiment of the present invention, referring to FIG. 4, the servo control system 10 further includes a current sampling module 13. An input terminal of the current sampling module 13 is coupled to the electronic switch circuit 122 of the driving module 12. An output terminal of the current sampling module 13 is coupled to the main control module 11. The current sampling module 13 is used to collect current operation current of the driving motor 20 and transmit it to the main control module 11. Specifically, the current sampling module 13 includes a first through third current sampling circuit, for respectively perform a current sampling to the three phases A, B and C of the driving motor 20. Wherein, FIG. 5A is a schematic circuit diagram of a first current sampling circuit 131 of the current sampling module 13 for collecting operation current of phase A of the driving motor of FIG. 4. The first current sampling circuit 131 is used to perform a current sampling to the phase A of the driving motor 20. The first current sampling circuit 131 includes a ninth resistor R9, a second resistor R10, an eleventh resistor R11, a twelfth resistor R12, a third capacitor C3 and a fourth capacitor C4. A first end of the ninth resistor R9 is coupled to the second path terminal of the second MOS transistor Q2. A second end of the ninth resistor R9 is coupled to the second voltage terminal P_3.3V via the eleventh resistor R11. The second end of the ninth resistor R9 is further grounded via the third capacitor C3. The first end of the tenth resistor R10 is coupled between the third capacitor and the ground. The second end of the tenth resistor R10 and the second end of the ninth resistor R9 are coupled to the main control module 11. The tenth resistor R10 is further coupled to the main control module 11 in the twelfth resistor R12, and the fourth capacitor C4 is coupled to the two ends of the twelfth resistor R12 in parallel. The current sampling circuit for sampling the phase B of the driving motor 20 and the current sampling circuit 131 are the same in structural composition, element connections and working principle, and is not repeated herein.

Figure 4:
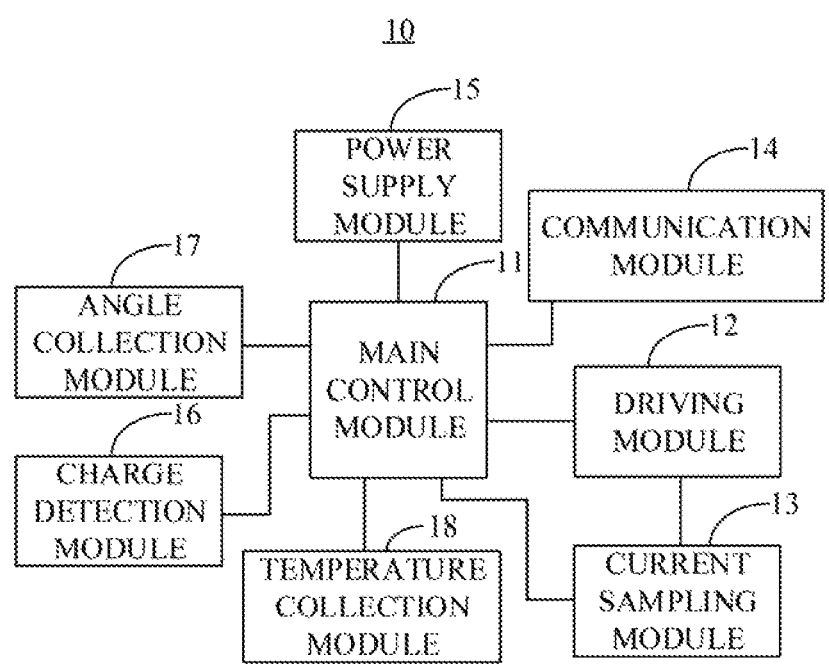
FIG. 4 is schematic block diagram of a servo control system of a preferred embodiment of the present invention.
Figure 5A:
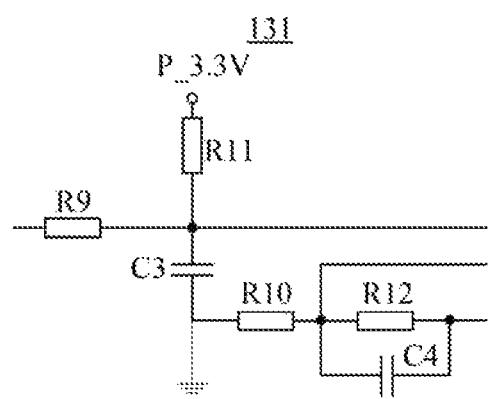
FIG. 5A is a schematic circuit diagram of a current sampling module used to collect operation current of phase A of the driving motor of FIG. 4.
Figure 5B:
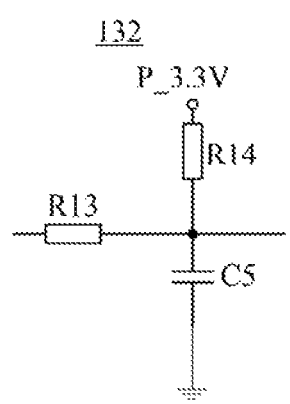
FIG. 5B is a schematic circuit diagram of a current sampling module used to collect operation current of phase C of the driving motor of FIG. 4.

FIG. 5B is a schematic circuit diagram of a second current sampling circuit 132 of the current sampling module 13 for collecting operation current of phase A of the driving motor of FIG. 4. The second current sampling circuit 132 is used to perform a current sampling to the phase C of the driving motor 20. The second current sampling circuit 132 includes a thirteen resistor R13, a fourteen resistor R14 and a fifth capacitor C5. A first end of the thirteen resistor R13 is coupled to the second path terminal of the sixth MOS transistor Q6, and a second end is coupled to the second voltage terminal P_3.3V via the fourteen resistor R14. The second end of the thirteen resistor R13 is further grounded via the fifth capacitor C5. The second end of the thirteen resistor R13 is further coupled to the main control module 11 so as to feedback the detected current to the main control module 11.

With continuing reference to FIG. 4, the servo control system 10 further includes a communication module 14 coupled to the main control module 11 and a host computer and configured to maintain a communication between the main control module 11 and the host computer so as to transmit action information and instructions of a servo.

Referring further to FIG. 4, the servo control system 10 further includes a power supply module 15 and a charge detection module 16 coupled to the main control module 11. The power supply module 15 is used to provide a power supply for a servo. The charge detection module 16 is used to collect a charge of a battery inside a servo.

The servo control system 10 further includes an angle collection module 17 coupled to the main control module 11. The angle collection module 17 is used to acquire information of rotation angle of a servo. The main control module 11 is used to control motion of the servo according to the information of angle. In an embodiment of the present invention, the angle collection module 17 may be a magnetic encoder that is used to acquire into manor of rotation angle of a servo according to the change of magnetic field when the driving motor rotates. The angle collection module 17 may also be a potentiometer that acquires information of rotation angle of a servo according to position change of the driving motor.

Figure 6:
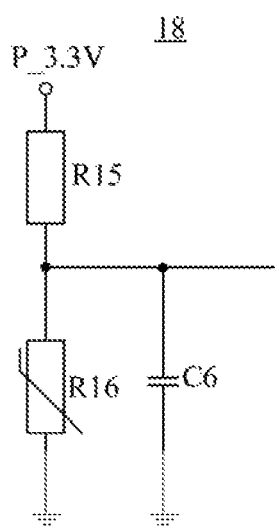
FIG. 6 is a schematic circuit diagram of a temperature collection module of FIG. 4.

With continuing reference to FIG. 4, the servo control system 10 further includes a temperature collection module 18 coupled to the main control module 11. The temperature collection module 18 is used to collect a temperature of a driving motor. If the collected temperature of the driving motor is greater than a preset threshold value, the main control module 11 controls the driving motor to stop rotating, or reduces a rotation speed of the driving motor. As shown in FIG. 6, the temperature collection module 18 includes a fifteen resistor R15, a sixteen resistor R16 and a sixth capacitor C6. A first end of the fifteen resistor R15 is coupled to the second voltage terminal P_3.3V, and a second end is grounded via the sixteen resistor R16 and the sixth capacitor C6. The second end of the fifteen resistor R15 is further coupled to the main control module 11 so as to feedback the detected temperature information to the main control module 11 through electrical signals, causing the main control module 11 to further control the rotation of the driving motor 20 according to detected temperature information. In an embodiment of the present invention, the sixteen resistor R16 is a negative temperature coefficient thermistor, its resistance changes along with temperature, divides voltage with the second resistor R2 and converts it into electrical signals, and outputs them to the main control module 11.

Figure 7:
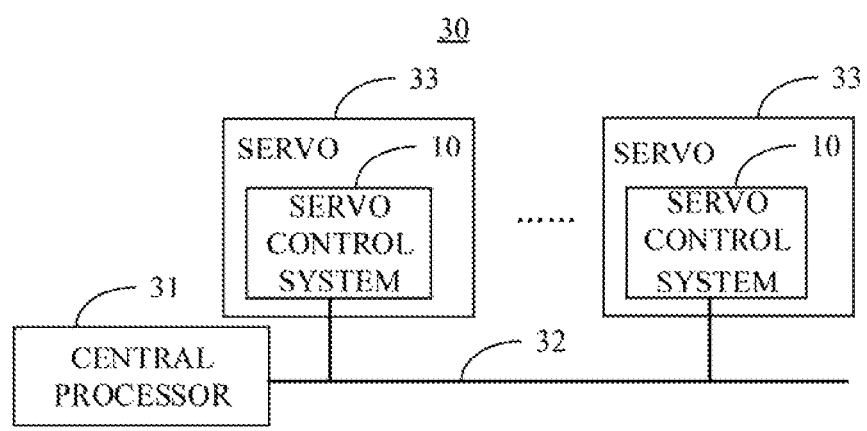
FIG. 7 is a schematic block diagram of a robot of a preferred embodiment of the present invention.

The present invention further provides a robot. As shown in FIG. 7, a robot 30 includes a central processor 31, a CAN bus 32 and a plurality of servos 33. Each servo 33 includes a servo control system 10 as described hereinbefore. Each servo control system 10 communicates with the central processor 31 via the CNN bus 32.

In summary, the servo control system of the present invention includes a main control module 11 and a driving module 12 including a driving circuit 121 and an electronic switch circuit 122. The driving circuit 121 is coupled to the main control module 11. The electronic switch circuit 122 is coupled between the driving circuit 121 and a driving motor 20 of a servo. Wherein, the driving circuit 121 receives a control signal outputted by the main control module 11 and outputs a driving signal according to the control signal. The electronic switch circuit 122 outputs a driving pulse to the driving motor 20 according to the driving signal, to control the rotation of the driving motor 20. By independently arranging the driving circuit 121 and the electronic switch circuit 122, it can be convenient for heat dissipation and strengthens the driving capability.

The foregoing descriptions are merely embodiments of the present invention, and the protection scope of the present invention is not limited thereto. All equivalent structural or process changes made according to the content of this specification and accompanying drawings in the present invention, or by directly or indirectly applying the present invention in other relevant technical fields, shall fall within the protection scope of the present invention.

What is claimed is:

1. A servo control system, applied to a servo, wherein the servo control system comprises:
   a main control module; and
   a driving module comprising a driving circuit and an electronic switch circuit, the driving circuit being coupled to the main control module, and the electronic switch circuit being coupled between the driving circuit and a driving motor of the servo, wherein:
   the driving circuit receives a control signal outputted by the main control module and outputs a driving signal according to the control signal, and the electronic switch circuit outputs a driving pulse to the driving motor according to the driving signal, to control the driving motor to rotate;
   wherein the driving motor is a three-phase driving motor, neutral points of three-phase windings of the three-phase driving motor are coupled together, the driving motor comprises a first terminal, a second terminal and a third terminal, the driving circuit comprises three driving units, and driving chips of the three driving units are connected to the first terminal, the second terminal and the third terminal through the electronic switch circuit respectively for powering up any two of the first terminal, the second terminal and the third terminal of the driving motor so as to control the driving motor to rotate in a forward direction or a reverse direction.

2. The servo control system according to claim 1, wherein the electronic switch circuit comprises a first MOS transistor, a second MOS transistor, a third MOS transistor, a fourth MOS transistor, a fifth MOS transistor and a sixth MOS transistor, control terminals of the first MOS transistor, the second MOS transistor, the third MOS transistor, the fourth MOS transistor, the fifth MOS transistor and the sixth MOS transistor are coupled to the driving circuit, first path terminals of the first MOS transistor, the third MOS transistor and the fifth MOS transistor are connected to a first reference voltage, a second path terminal of the first MOS transistor is coupled to the first path terminal of the second MOS transistor and the first terminal of the driving motor, a second path terminal of the third MOS transistor is coupled to the first path terminal of the fourth MOS transistor and the second terminal of the driving motor, a second path terminal of the fifth MOS transistor is coupled to the first path terminal of the sixth MOS transistor and the third terminal of the driving motor, and second path terminals of the second MOS transistor, the fourth MOS transistor and the sixth MOS transistor are connected to a second reference voltage.

3. The servo control system according to claim 1, wherein the servo control system further comprises a communication module coupled to the main control module and a host computer and configured to maintain a communication between the main control module and the host computer.

4. The servo control system according to claim 1, wherein the servo control system further comprises a power supply module and a charge detection module coupled to the main control module, the power supply module is configured to provide a power supply for the servo, and the charge detection module is configured to collect a charge of a battery inside the servo.

5. The servo control system according to claim 1, wherein the servo control system further comprises an angle collection module coupled to the main control module, the angle collection module is configured to acquire information of rotation angle of the servo, and the main control module is further configured to control motion of the servo according to the information of angle.

6. The servo control system according to claim 2, wherein the driving unit of the driving circuit comprises a driving chip, a first capacitor, a fourth resistor, a fifth resistor, a sixth resistor, a first diode, a seventh resistor, an eighth resistor, a second diode, a third diode, and a second capacitor, the driving chip comprises a first through eighth terminals;

the first terminal of the driving chip is coupled to a first voltage terminal, the first terminal is further grounded via the first capacitor, the second terminal and the third terminal of the driving chip are coupled to the main control chip, the second terminal is further coupled to a second voltage terminal via the fourth resistor, the third terminal is further grounded via the fifth resistor, the fourth terminal of the driving chip is coupled to the second path terminal of the second MOS transistor, the fifth terminal of the driving chip is coupled to the control terminal of the second MOS transistor via the sixth resistor, two ends of the sixth resistor are coupled to the first diode in parallel, a cathode of the first diode is coupled to the fifth terminal of the driving chip, an anode of the first diode is coupled to the control terminal of the second MOS transistor, the sixth terminal of the driving chip is coupled to the second path terminal of the first MOS transistor, the seventh terminal of the driving chip is coupled to the control terminal of the first MOS transistor via the seventh resistor, two ends of the seventh resistor are coupled to the second diode in parallel and a cathode of the second diode is coupled to the seventh terminal of the driving chip, an anode of the second diode is coupled to the control terminal of the first MOS transistor, the eighth terminal of the driving chip is coupled to the first voltage terminal via the eighth resistor and the third diode and a cathode of the third diode is coupled to the eighth resistor, an anode of the third diode is coupled to the first terminal of the driving chip, and the eighth terminal and the sixth terminal of the driving chip are coupled to each other via the second capacitor.

7. The servo control system according to claim 2, wherein the servo control system further comprises a current sampling module, an input terminal of the current sampling module is coupled to the electronic switch circuit, and an output terminal is coupled to the main control module, and the current sampling module is configured to collect current operation current of the driving motor and transmit the current operation current of the driving motor to the main control module.

8. The servo control system according to claim 5, wherein the angle collection module is a magnetic encoder, and is configured to acquire information of angle of the servo according to change of magnetic field when the driving motor rotates.

9. The servo control system according to claim 6, wherein the driving chip outputs control singles respectively to the control terminal of the first MOS transistor and the control terminal of the second MOS transistor via the seventh terminal and the fifth terminal, which controls the first MOS transistor and the second MOS transistor to conduct, thereby powering up the first terminal of the driving motor.

10. The servo control system according to claim 7, wherein the current sampling module comprises a first current sampling circuit, a second current sampling circuit and a third current sampling circuit, for respectively perform a current sampling to the first terminal, the third terminal and the second terminal of the driving motor;

wherein each of the first current sampling circuit and the third current sampling circuit comprises a ninth resistor, a second resistor, an eleventh resistor, a twelfth resistor, a third capacitor and a fourth capacitor, a first end of the ninth resistor is coupled to a second path terminal of the second MOS transistor, a second end of the ninth resistor is coupled to a second voltage terminal via the eleventh resistor, the second end of the ninth resistor is further grounded via the third capacitor, a first end of the tenth resistor is coupled between the third capacitor and the ground, a second end of the tenth resistor and the second end of the ninth resistor are coupled to the main control module, the tenth resistor is further coupled to the main control module via the twelfth resistor, and the fourth capacitor is coupled to two ends of the twelfth resistor in parallel; and wherein the second current sampling circuit comprises a thirteen resistor, a fourteen resistor and a fifth capacitor, a first end of the thirteen resistor is coupled to a second path terminal of the sixth MOS transistor, and a second end of the thirteen resistor is coupled to the second voltage terminal via the fourteen resistor, the second end of the thirteen resistor is further grounded via the fifth capacitor, the second end of the thirteen resistor is further coupled to the main control module so as to feedback the detected current to the main control module.

11. The servo control system according to claim 8, wherein the servo control system further comprises a temperature collection module coupled to the main control module, the temperature collection module is configured to collect a temperature of the driving motor, if the collected temperature of the driving motor is greater than a preset threshold value, the main control module controls the driving motor to stop rotating, or reduces a rotation speed of the driving motor.

12. A robot, wherein the robot comprises a central processor, a CAN bus and a plurality of servos, each servo comprising a servo control system, each servo control system communicating with the central processor via the CAN bus, the servo control system comprising:

a main control module; and
a driving module comprising a driving circuit and an electronic switch circuit, the driving circuit being coupled to the main control module, and the electronic switch circuit being coupled between the driving circuit and a driving motor of the servo, wherein:
the driving circuit receives a control signal outputted by the main control module and outputs a driving signal according to the control signal, and the electronic switch circuit outputs a driving pulse to the driving motor according to the driving signal, to control the driving motor to rotate;
wherein the driving motor is a three-phase driving motor, neutral points of three-phase windings of the three-phase driving motor are coupled together, the driving motor comprises a first terminal, a second terminal and a third terminal, the driving circuit comprises three driving units, and driving chips of the three driving units are connected to the first terminal, the second terminal and the third terminal through the electronic switch circuit respectively for powering up any two of the first terminal, the second terminal and the third terminal of the driving motor so as to control the driving motor to rotate in a forward direction or a reverse direction.

13. The robot according to claim 12, wherein the electronic switch circuit comprises a first MOS transistor, a second MOS transistor, a third MOS transistor, a fourth MOS transistor, a fifth MOS transistor and a sixth MOS transistor, control terminals of the first MOS transistor, the second MOS transistor, the third MOS transistor, the fourth MOS transistor, the fifth MOS transistor and the sixth MOS transistor are coupled to the driving circuit, first path terminals of the first MOS transistor, the third MOS transistor and the fifth MOS transistor are connected to a first reference voltage, a second path terminal of the first MOS transistor is coupled to the first path terminal of the second MOS transistor and the first terminal of the driving motor, a second path terminal of the third MOS transistor is coupled to the first path terminal of the fourth MOS transistor and the second terminal of the driving motor, a second path terminal of the fifth MOS transistor is coupled to the first path terminal of the sixth MOS transistor and the third terminal of the driving motor, and second path terminals of the second MOS transistor, the fourth MOS transistor and the sixth MOS transistor are connected to a second reference voltage.

14. The robot according to claim 12, wherein the servo control system further comprises a communication module coupled to the main control module and a host computer and configured to maintain a communication between the main control module and the host computer.

15. The robot according to claim 12, wherein the servo control system further comprises a power supply module and a charge detection module coupled to the main control module, the power supply module is configured to provide a power supply for the servo, and the charge detection module is configured to collect a charge of a battery inside the servo.

16. The robot according to claim 12, wherein the servo control system further comprises an angle collection module coupled to the main control module, the angle collection module is configured to acquire information of rotation angle of the servo, and the main control module is further configured to control motion of the servo according to the information of angle.

17. The robot according to claim 13, wherein the servo control system further comprises a current sampling module, an input terminal of the current sampling module is coupled to the electronic switch circuit, and an output terminal is coupled to the main control module, and the current sampling module is configured to collect current operation current of the driving motor and transmit the current operation current of the driving motor to the main control module.

18. The robot according to claim 16, wherein the angle collection module is a magnetic encoder, and is configured to acquire information of angle of the servo according to change of magnetic field when the driving motor rotates.

19. The robot according to claim 17, wherein the current sampling module comprises a first current sampling circuit, a second current sampling circuit and a third current sampling circuit, for respectively perform a current sampling to the first terminal, the third terminal and the second terminal of the driving motor;

wherein each of the first current sampling circuit and the third current sampling circuit comprises a ninth resistor, a second resistor, an eleventh resistor, a twelfth resistor, a third capacitor and a fourth capacitor, a first end of the ninth resistor is coupled to a second path terminal of the second MOS transistor, a second end of the ninth resistor is coupled to a second voltage terminal via the eleventh resistor, the second end of the ninth resistor is further grounded via the third capacitor, a first end of the tenth resistor is coupled between the third capacitor and the ground, a second end of the tenth resistor and the second end of the ninth resistor are coupled to the main control module, the tenth resistor is further coupled to the main control module via the twelfth resistor, and the fourth capacitor is coupled to two ends of the twelfth resistor in parallel; and wherein the second current sampling circuit comprises a thirteen resistor, a fourteen resistor and a fifth capacitor, a first end of the thirteen resistor is coupled to a second path terminal of the sixth MOS transistor, and a second end of the thirteen resistor is coupled to the second voltage terminal via the fourteen resistor, the second end of the thirteen resistor is further grounded via the fifth capacitor, the second end of the thirteen resistor is further coupled to the main control module so as to feedback the detected current to the main control module.

20. The robot according to claim 18, wherein the servo control system further comprises a temperature collection module coupled to the main control module, the temperature collection module is configured to collect a temperature of the driving motor, if the collected temperature of the driving motor is greater than a preset threshold value, the main control module controls the driving motor to stop rotating, or reduces a rotation speed of the driving motor.

* * * * *